United States Patent [19]

Whitley et al.

[11] Patent Number: 5,590,373

[45] Date of Patent: Dec. 31, 1996

[54] FIELD PROGRAMMING APPARATUS AND METHOD FOR UPDATING PROGRAMS IN A PERSONAL COMMUNICATIONS DEVICE

[75] Inventors: Wayne P. Whitley; Randall S. Springfield, both of Boca Raton; Harold D. Hudson, Lake Worth; Byron K. Tiller, Boca Raton; David J. Allard, Boynton Beach; Daniel Ming-Te Hsieh, Coral Springs; Julie F. Goodwin, Boca Raton; Thomas T. Murakami, Deerfield Beach; Francis J. Canova, Jr., Boynton Beach, all of Fla.

[73] Assignee: International Business Machines Corporation, Armonk, N.Y.

[21] Appl. No.: 279,638

[22] Filed: Jul. 25, 1994

[51] Int. Cl.[6] .................................................. G06F 13/00
[52] U.S. Cl. ........................................... 395/828; 395/830
[58] Field of Search ...................................... 395/828, 830, 395/833, 882, 892, 282, 185.01, 185.02, 185.05, 185.07, 750

[56] References Cited

U.S. PATENT DOCUMENTS

| | | | |
|---|---|---|---|
| 4,521,645 | 6/1985 | Carroll | 179/5 |
| 4,589,063 | 5/1986 | Shah et al. | 395/828 |
| 4,677,653 | 5/1987 | Weiner et al. | 379/58 |
| 4,734,928 | 3/1988 | Weiner et al. | 379/59 |
| 4,843,326 | 6/1989 | Smythe | 324/503 |
| 4,899,377 | 2/1990 | Bauer et al. | 379/354 |
| 4,912,756 | 3/1990 | Hop | 379/60 |
| 4,964,038 | 10/1990 | Louis et al. | 395/830 |
| 4,969,836 | 11/1990 | Magnier et al. | 439/188 |
| 5,020,090 | 5/1991 | Morris | 379/58 |
| 5,038,320 | 8/1991 | Heath et al. | 395/830 |
| 5,099,426 | 3/1992 | Carlgren et al. | 364/419 |
| 5,127,041 | 6/1992 | O'Sullivan | 379/59 |
| 5,146,486 | 9/1992 | Lebowitz | 379/40 |
| 5,183,404 | 2/1993 | Aldous et al. | 439/55 |
| 5,200,991 | 4/1993 | Motoyanagi | 379/61 |
| 5,204,947 | 4/1993 | Bernstein et al. | 395/157 |
| 5,249,218 | 9/1993 | Sainton | 379/59 |
| 5,255,306 | 10/1993 | Melton et al. | 379/38 |
| 5,255,312 | 10/1993 | Koshiishi | 379/100 |
| 5,270,704 | 12/1993 | Sosa Quintana et al. | 340/870.02 |
| 5,272,747 | 12/1993 | Meads | 379/59 |
| 5,274,693 | 12/1993 | Waldman | 379/59 |
| 5,297,030 | 3/1994 | Vassigh et al. | 364/405 |
| 5,297,249 | 3/1994 | Bernstein et al. | 395/156 |
| 5,302,947 | 4/1994 | Fuller et al. | 340/825.34 |
| 5,313,596 | 5/1994 | Swindler et al. | 395/325 |
| 5,410,707 | 4/1995 | Bell | 395/700 |
| 5,446,869 | 8/1995 | Padgett et al. | 395/500 |
| 5,471,674 | 11/1995 | Stewart et al. | 395/650 |

FOREIGN PATENT DOCUMENTS

| | | |
|---|---|---|
| 0481887A2 | 4/1992 | European Pat. Off. . |
| 3703044A1 | 3/1988 | Germany . |
| 64-71369 | 3/1989 | Japan . |
| 5-244243 | 9/1993 | Japan . |
| 1597163 | 9/1981 | United Kingdom . |

*Primary Examiner*—Robert W. Beausoliel, Jr.
*Assistant Examiner*—Ly V. Hua
*Attorney, Agent, or Firm*—George E. Grosser

[57] ABSTRACT

A field programming tool for a personal communications device, provides an automatic, capability to update computer programs stored in the device. The personal communications device includes an electrically programmable read only memory (EPROM), that stores the operating system programs and the applications programs to be loaded into a random access memory (RAM) for executed by a central processing unit (CPU) in the device. A reprogramming card is provided for the device, containing pre-stored new programs that are to be loaded into the EPROM of the device. A method is provided for automatically loading the new programs from the reprogramming card into the EPROM, in an accurate, foolproof manner. This is accomplished using a sequencing program stored on the reprogramming card and loaded into the RAM of the device, where it is executed. An option attach connector alerts the device that the reprogramming card is connected to the PCMCIA slot of the device. It's presence is a signal to the device to begin the automatic operation of reprogramming the EPROM with the new programs stored in the reprogramming card, using the sequencing program in the reprogramming card.

14 Claims, 12 Drawing Sheets

FIELD PROGRAMMING APPARATUS AND METHOD FOR UPDATING PROGRAMS IN A PERSONAL COMMUNICATIONS DEVICE

FIELD OF THE INVENTION

The invention disclose broadly relates to data processing systems and data communications systems and more particularly relates to a field programming device for such systems.

BACKGROUND OF THE INVENTION

It is widely recognized that digital communications technology and data processing technology are converging. One example of this is the development of portable personal computers that include telephone modems, enabling the transmission of digital information over public switched telephone networks. Another example is the development of mobile radio telephones that use microprocessors executing stored programs for sampling and digitizing the voice signal, multiplexing the transmission of the digitized voice signal with other such voice signals, and digitally controlling the operations of the cellular telephone device.

The most recent evidence of the convergence of digital communications technology with digital personal computer technology, is the SIMON personal communications device announced by the IBM Corporation in 1994. The SIMON personal communications device has many features within it to enable personal communications. The personal communications device provides a cellular telephone, a facsimile transmission and receiving capability, an electronic mail sending and receiving capability, and an electronic pager, a computer notepad, a computer address book, a computer calendar, and a computer calculator, all within a single compact portable package.

The SIMON personal communications device includes a central processing unit (CPU) that executes stored programmed instructions stored in electrically programmable read only memories (EPROM). The stored program instruction in the EPROM's include basic input output operating system (BIOS) programs, and application programs to perform the functions of cellular telephony, public switched telephone network (PSTN) telephony, facsimile transmission and reception, electronic mail, pager functions, computer notepad functions, computer address book functions, computer calendar functions, and computer calculator functions. These stored programs are selectively transferred from the EPROM's to a read/write random access memory (RAM) for storage and execution by the CPU.

The SIMON personal communications device also includes a display having a touch overlay membrane, to enable the user to input keyboard entries in the for of tactile pressure with a finger or a stylus.

The storage capacity of the RAM can be augmented by employing supplementary memory in the form of a personal computer memory card (PCMCIA) (Trademark of the Personal Computer Memory Card International Association). The personal computer memory card can include extra RAM to supplement the RAM storage in the personal communications device, by plugging the personal computer memory card into a PCMCIA receptacle slot in the personal communications device.

The rapid advance in the technology of computer programming, data processing functions and communications functions, dictates the frequent revision of the computer programs used in high function systems such as a portable computer or the SIMON personal communications device. However, the techniques to reprogram EPROM's require accurate, painstaking steps to accurately erase only those portions of the stored programs that need to be replaced and to accurately substitute the new programs in the device. The requirement for accurate, painstaking care in the reprogramming of the EPROM's, makes the upgrading of computer programs in a portable personal communications device or in a portable computer an unsuitable job for the casual user.

OBJECTS OF THE INVENTION

It is therefore an object of the invention to provide an automatic, foolproof means to update computer programs stored in a personal communications device.

It is another object of the invention to provide an automatic foolproof means to update computer programs stored in a portable computer.

It is a further object of the invention to provide a means for accurate and foolproof updating of information stored in EPROM devices.

It is a further object of the invention to provide a flexible means to reconfigure the programmable functions of a portable communications device.

It is a further object of the invention to provide a flexible means to reconfigure the programmable functions of a portable computer.

SUMMARY OF THE INVENTION

These and other objects, features and advantages are accomplished by the field programming tool disclosed herein.

A field programming tool is disclosed for a personal communications device, that provides an automatic, foolproof means to update computer programs stored in the device.

The personal communications device includes an electrically programmable read only memory (EPROM), that stores the operating system programs and the applications programs to be loaded into a random access memory (RAM) for executed by a central processing unit (CPU) in the device. The programs selectively manage the operations of a cellular telephone, a facsimile receiver, a touch overlay input and display, and several desktop functions such as a calendar, notepad, and electronic mail. A personal computer memory card (PCMCIA card) is included to enable adding auxiliary RAM storage or pre-stored ROM storage to the device. The PCMCIA card is connected to the device by its insertion into a PCMCIA receptacle slot in the device.

In accordance with the invention, a reprogramming card is provided for the device, containing pre-stored new programs that are to be loaded into the EPROM of the device. Further in accordance with the invention, a method is provided for automatically loading the new programs from the reprogramming card into the EPROM, in an accurate, foolproof manner. This is accomplished using a sequencing program stored on the reprogramming card and loaded into the RAM of the device, where it is executed.

The device is capable of performing many types of communications functions that require a variety of communications links. In addition to the radio link provided for cellular telephony, the device must be able to connect to a conventional RJ11 telephone jack for public switched telephone service, to an RS232 serial data connector, to diagnostic cables, to external keyboards, and to hands-free microphones and speakers. To consolidate these connection requirements, an option attach connector is provided for the device. The option attach connector includes three programmable indicator bits that indicate to the device, the role the connector is playing when it is connected to the device.

In accordance with the invention, the option attach connector has one indicator bit combination that alerts the device that the reprogramming card is connected to the PCMCIA slot of the device. In this state, the option attach connector is referred to as a reprogramming option connector. It's presence is a signal to the device to begin the automatic operation of reprogramming the EPROM with the new programs stored in the reprogramming card, using the sequencing program in the reprogramming card.

In accordance with the invention, the reprogramming option connector includes voltage regulation and switching circuitry to provide a well regulated, switched reprogramming voltage to the EPROM of the device, during the interval when the existing programs are being erased in the EPROM and the new programs are being written in it. Further in accordance with the invention, the reprogramming voltage produced by the reprogramming option connector is switched on and off in response to control signals from the device, that are patterned by the sequencing program being executed in the device.

In this manner, the field programming tool, which includes the reprogramming card and the reprogramming option connector, provides an accurate, foolproof means of reconfiguring the programs and functions of the personal communications device.

DESCRIPTION OF THE FIGURES

These and other objects, features and advantages will be more fully appreciated with reference to the accompanying figures.

FIG. 7A(1) and 7A(2) is a flow diagram of an example sequencing program for full erase of an EPROM.

FIG. 8A(1) and 8A(2) is a flow diagram of an example of a sequencing program for the selected erase of an EPROM.

DISCUSSION OF THE PREFERRED EMBODIMENT

Figure 1:
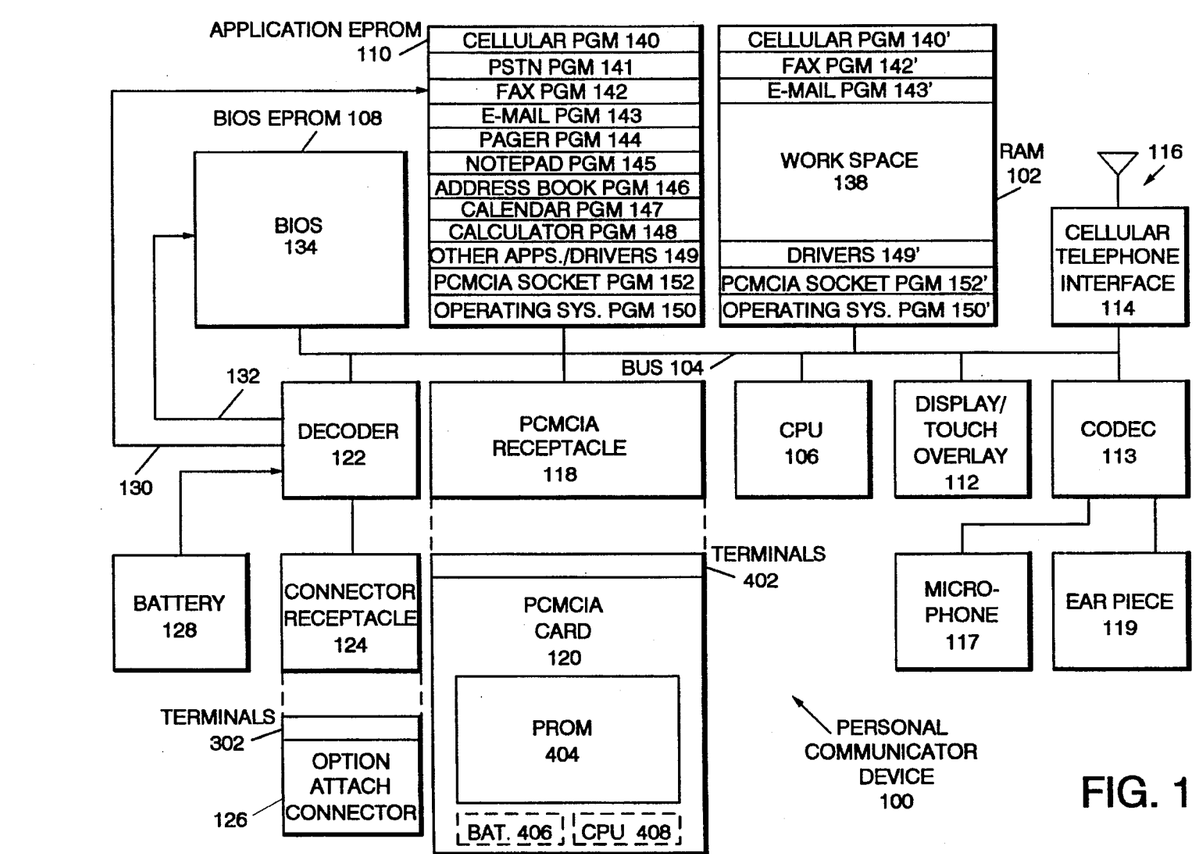
FIG. 1 is an overall functional block diagram of the personal communications device, in accordance with the invention.

The personal communication system diagram of FIG. 1 shows the personal communications device 100. The device 100 includes the RAM 102 which is connected by means of the bus 104 to the CPU 106, which executes the stored program instructions in the RAM 102. Also connected to the bus 104 is the BIOS EPROM 108 which stores the basic input output operating system (BIOS) program 134 in 128 kbyte electrically programmable read only memory. Also connected to the bus 104 is the application EPROM 110 which stores application programs. Application programs stored in the application EPROM 110 can include the cellular telephone program 140, the public switched telephone network (PSTN) program 141, the facsimile program 142, the electronic mail (E-MAIL) program 143, the pager program 144, the notepad program 145, the address book program 146, the calendar program 147, the calculator program 148, and other applications and I/O driver programs 149. Also included in the application EPROM 110 is the operating system program 150. Also included in the application EPROM 110 is the PCMCIA card and socket services program 152. The programs stored in the BIOS 108 and the application EPROM 110, can be selectively written into the RAM 102 where they are available for execution by the CPU 106.

Also connected to the bus 104 is PCMCIA receptacle slot 118 which is adapted to receive the personal computer memory card 120. The personal computer memory card is a PCMCIA standard card as specified in the publication "PC Card Standard", release 2.0, published by Personal Computer Memory Card International Association, September 1991. The PCMCIA card and socket services program 152 manages the interface between the CPU 106 and the personal computer memory card 120. The PCMCIA card and socket services program 152 is described in greater detail in the publication "Socket Services Interface Specification", release 1.0, published by the Personal Computer International Association, September 1991. The personal computer memory card 120, can include extra RAM storage to perform functions such as backup and restore, and to save facsimile images received by the system 100. The personal computer memory card 120 can also include a read only memory (ROM) which has stored in it other pre-stored information such as a metropolitan phone directory.

In accordance with the invention, the personal computer memory card 120 can be configured as a reprogramming card 120' for the personal communications device 100. The reprogramming card 120' can contain pre-stored new programs that are to be loaded into the EPROM's 108 and/or 110. Further in accordance with the invention, a sequencing program 420, which is described in greater detail below, will supervise the automatic loading of new programs from the reprogramming card 120' into the EPROM's 108 and 110, in an accurate and foolproof manner. The sequencing program 420 which is stored in the reprogramming card 120', is loaded into the RAM 102 of the device 100, where it is executed by the CPU 106.

Also connected to the bus 104 is the display and touch overlay 112, and a cellular telephone 114 with its antenna 116.

The device 100 is capable of performing many types of communications functions over a variety of communications links. In addition to the radio link provided by the cellular telephone 114 and its antenna 116, the device 100 must be able to connect to a conventional RJ11 telephone jack for public switched telephone service. The device 100 must also be able to connect to a RS232 serial data connector for data communications applications. The device 100 must also be able to connect to diagnostic cables for diagnosing the operation of the device 100. The device 100 must also be able to connected to an external keyboard when desired. The device must also be able to connect to hands-free microphone and speaker to enable the user to speak on the telephone without having to handle the microphone 117 and ear piece 119 units in the device 100. The codec 113 is connected to the bus 104, for converting analog voice signals to digital voice signals and vice versa. The codec 113 is connected to the microphone 117 and speaker 119 which are an integral part of the personal communications device 100.

To consolidate the connection requirements for the device 100, an option attach connector 126 and its 33 pin receptacle 124 are coupled to the bus 104 through the decoder 122. The option attach connector 126, shown in greater detail in FIGS. 2A to 2H and in FIG. 3, includes three programmable indicator bits that indicate to the device 100, the role that the option attach connector 126 is playing when it is connected through the receptacle 124 to the decoder 122 and the bus 104.

Figure 2A:
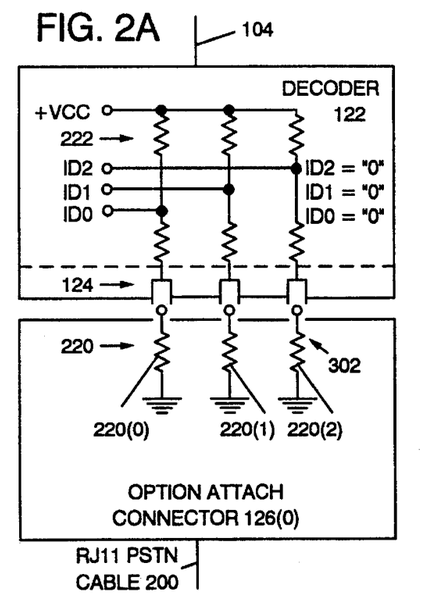
FIGS. 2A to 2H are a schematic diagrams of several embodiments of the option attach connector.
Figure 2B:
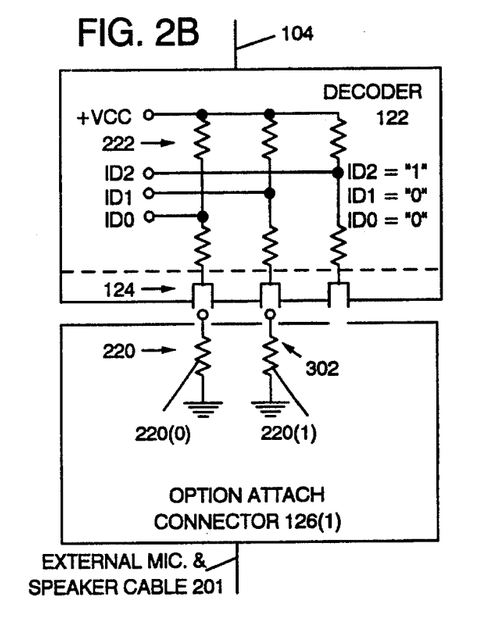
Figure 2C:
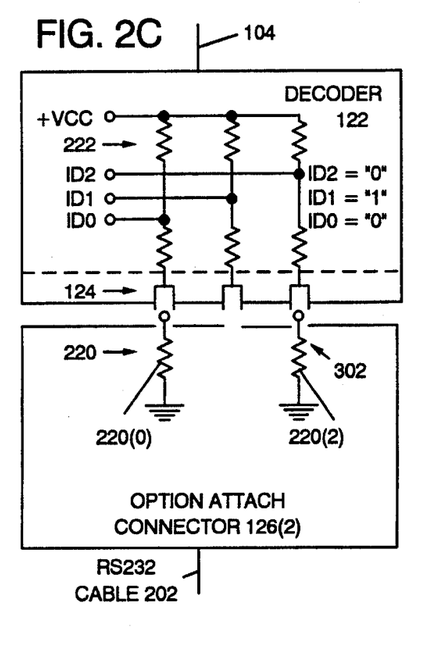
Figure 2D:
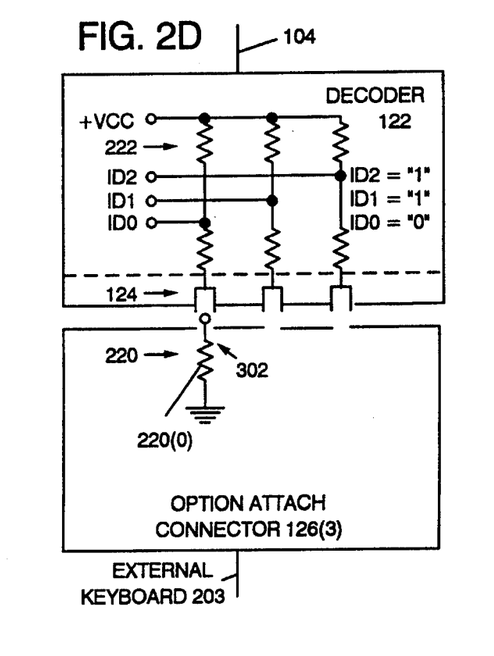
Figure 2E:
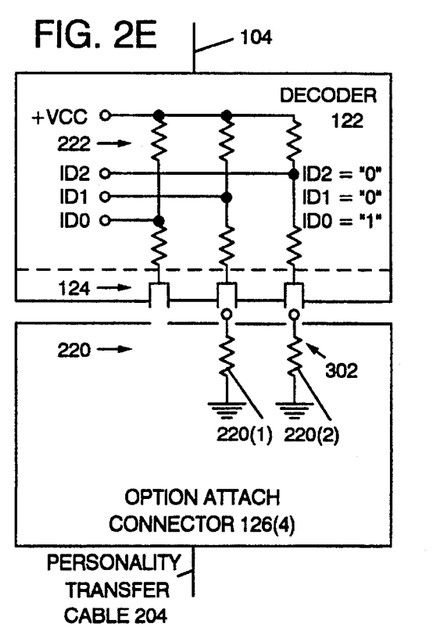
Figure 2F:
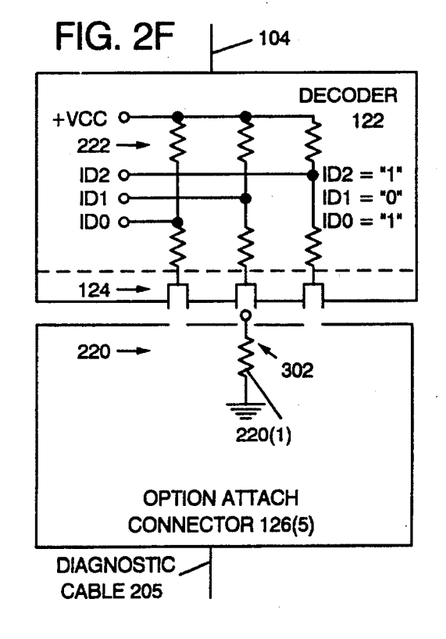
Figure 2G:
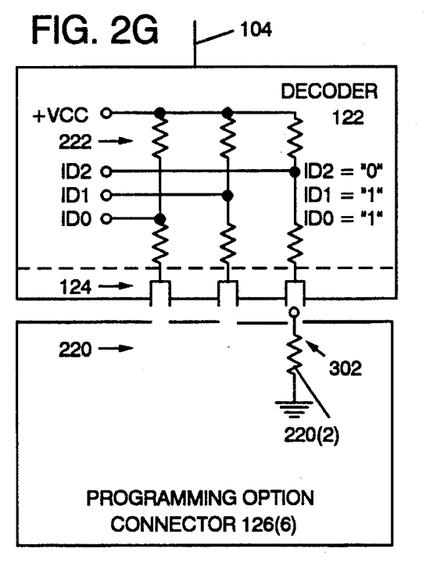
Figure 2H:
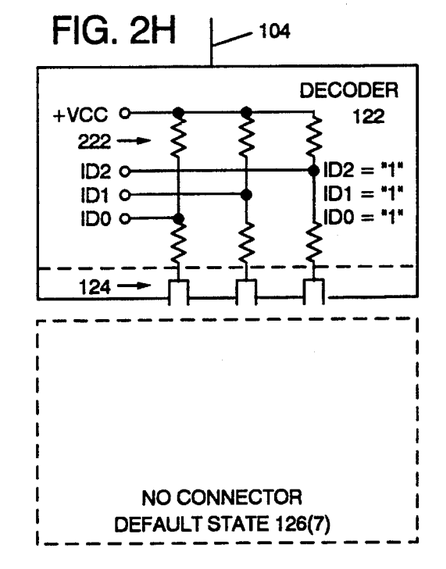

In accordance with the invention, the option attach connector 126 has one indicator bit combination shown in FIG. 2G, that alerts the device 100 that the reprogramming card 120' is connected to the PCMCIA receptacle slot 118 of the device 100. In this state, the option attach connector 126 is referred to as a reprogramming option connector 126(6), shown in FIG. 2G and FIG. 3. The presence of the reprogramming option connector 126(6) in the receptacle 124, as detected by the decoder 122, is a signal to the device 100 to begin the automatic operation of reprogramming the EPROM's 108 and/or 110 with new programs that are stored in the reprogramming card 120'. The reprogramming operation is carried out by the sequencing program 420 in the reprogramming card 120', as is shown in FIG. 4, and in the flow diagrams of FIGS. 5, 6A, 7A and 8A.

Figure 3:
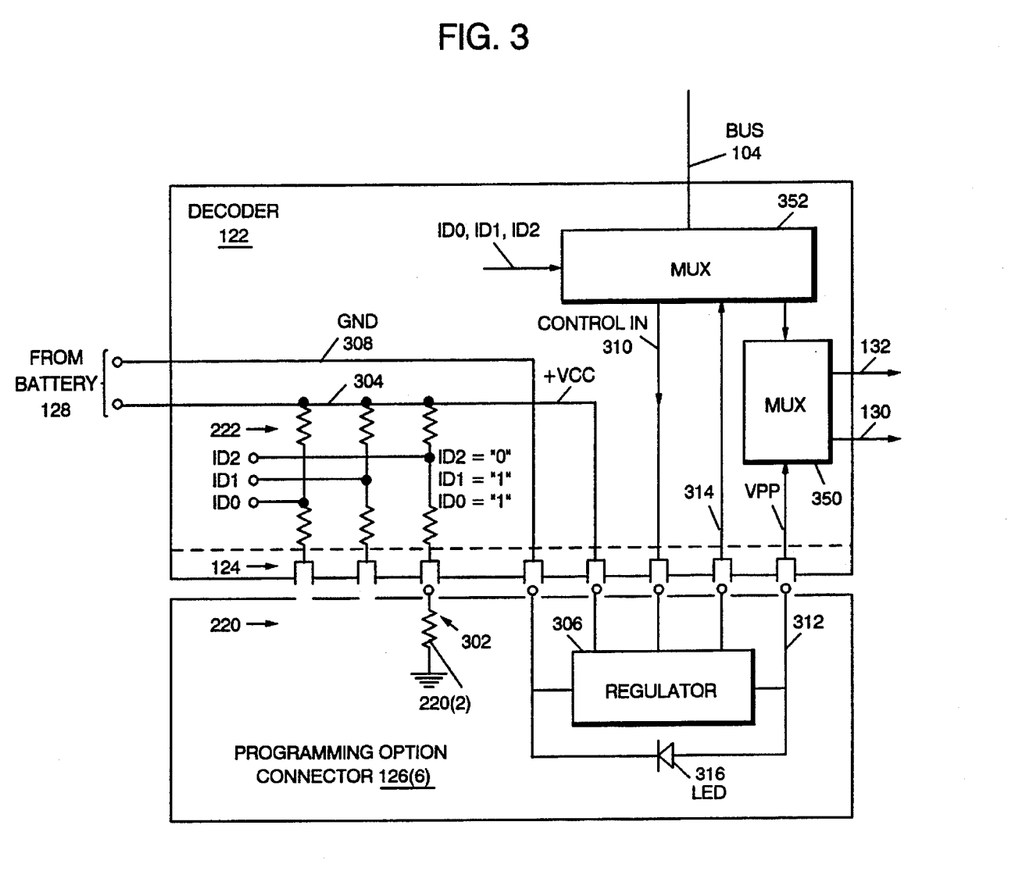
FIG. 3 is a detailed circuit diagram of the reprogramming option connector and the decoder.
Figure 4:
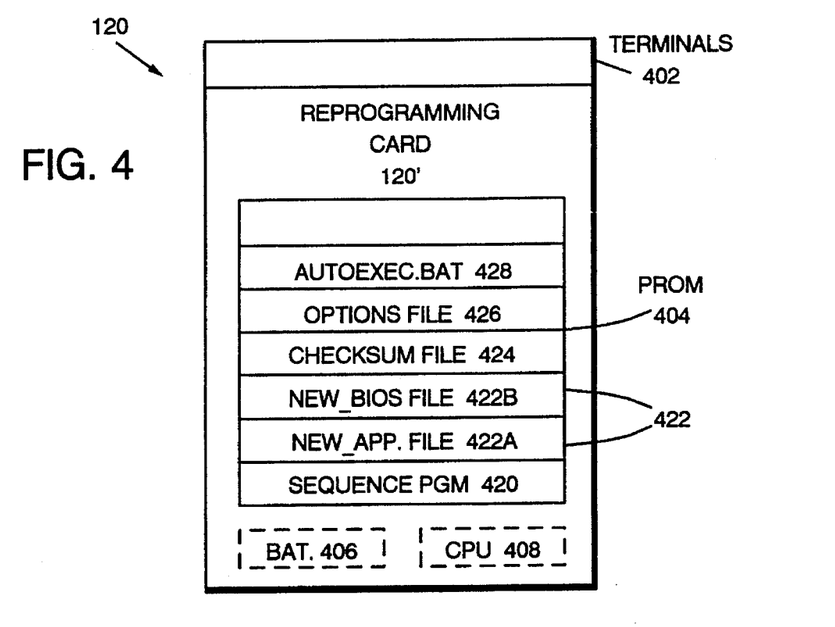
FIG. 4 is a functional block diagram of the reprogramming card 120'.

In accordance with the invention, the reprogramming option connector 126(6) includes voltage regulation and switching circuitry as is shown in FIG. 3, to provide a well regulated, switched reprogramming voltage to the EPROM's 108 and 110. The battery 128 shown in FIG. 1 is connected through the decoder 122, to the application EPROM 110 by means of line 130, and to the BIOS EPROM 108 by means of line 132. The regulated, switched reprogramming voltage applied by the reprogramming option connector 126(6) to the EPROM's 108 and/or 110, is done during the interval when the existing programs are being erased in the EPROM's 108 and/or 110, and the new programs are being written into them from the reprogramming card 120'.

Further in accordance with the invention, the reprogramming voltage VPP produced by the reprogramming option connector 126(6) in FIG. 3 is switched on and off in response to the control signals 310 from the CPU 106, that are patterned by the sequencing program 420 which is being executed in the CPU 106.

In this manner, the field programming tool invention, which includes the reprogramming card 120' and the reprogramming option connector 126(6), provides an accurate, foolproof means of reconfiguring the programs and functions of the personal communications device 100.

FIGS. 2A to 2H show the eight different option attach connector configurations when three ID bits ID0, ID1, and ID2 are used to configure the connector 126. The binary value of each ID bit ID0, ID1, or ID2 is established by the presence or absence of resistors 220(0), 220(1), or 220(2), respectively, each of which serves as a pull down resistor when connected to the circuit 222 of the decoder 122. For example, if there are no resistors 220 present for the three ID values ID0, ID1 and ID2, this corresponds to a default condition of FIG. 2H where no cable is attached to the connector 126(7). This is shown by the dotted out-line for 126(7) shown in FIG. 2H which corresponds to the binary value "111"for ID0, ID1, and ID2.

Figure 6A:
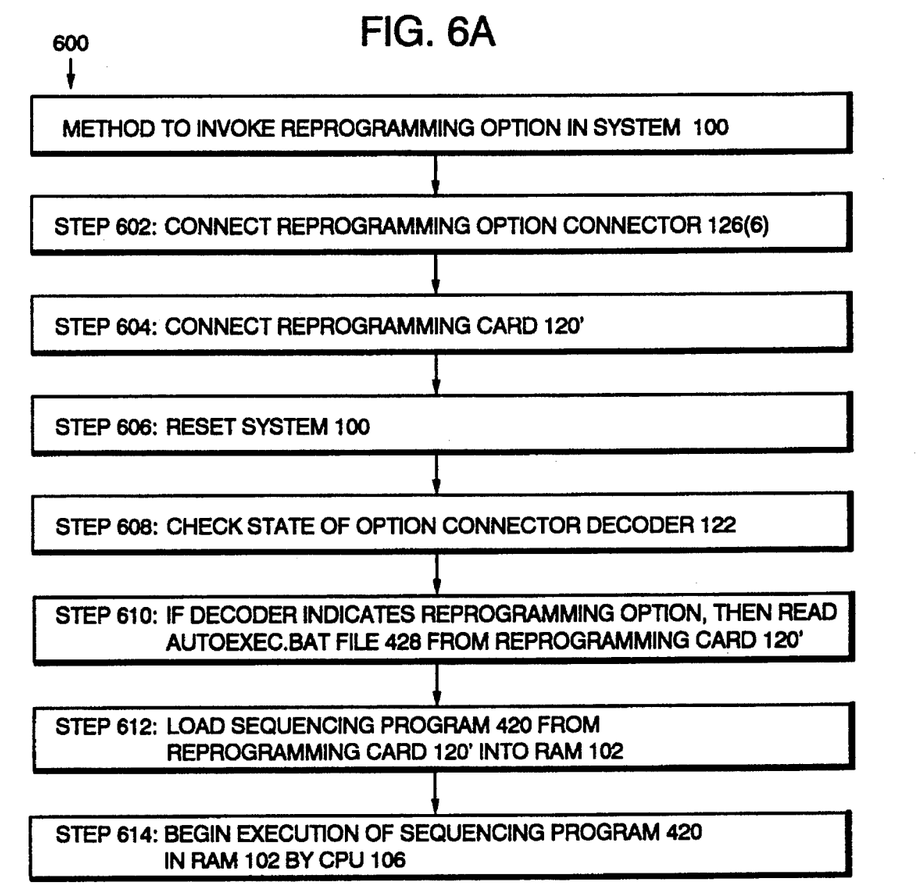
FIG. 6A is a flow diagram of the method to invoke the reprogramming option in the device 100.

When the option attach connection 126 is configured in FIG. 2G to be the reprogramming option connection 126(6), then a single resistor 220(2) corresponds to the ID2 bit. This produces a binary value of ID0, ID1, and ID2 of "110", which signals to the decoder 122 that the reprogramming option connector 126(6) is connected to the receptacle 124 of the decoder 122. In response to the this condition, when the device 100 is reset by resetting the CPU 106, the CPU accesses the programmable read only memory (PROM) 404 in the reprogramming card 120' of the FIG. 4 to access the AUTOEXEC.BAT file 428 to be executed by the CPU 106. Reference to FIG. 6A shows the flow diagram of the steps that follow to load the sequencing program 420 into the RAM 102 and to begin execution of the sequencing program by the CPU 106.

Returning to FIGS. 2A to 2H, if the single resistor 220(1) is in the ID1 bit position, as shown in FIG. 2F, then the option attach connector is configured as 126(5) which indicates that a diagnostic cable 205 is attached to the connector.

If two resistors 220(1) and 220(2) are connected in the option attach connector 126 at the ID1 and ID2 positions, as shown in FIG. 2E, this corresponds to ID0, ID1, and ID2 equalling a binary "100", which indicates that a personality transfer cable 204 is attached to the connector 126(4).

In FIG. 2D, if a single resistor 220(0) is placed at the ID0 position, then ID0, ID1, and ID2 equalling a binary "011"is created, which corresponds to the connector 126(3), indicating that an external keyboard cable 203 is attached to the connector 126(3).

If two resistors 220(0) and 220(2) are placed at the ID0 and ID2 positions, as shown in FIG. 2C, then this corresponds to the connector 126(2), which means that an RS232 interface cable 202 is attached to the connector 126(2).

In FIG. 2B, if two resistors 220(0) and 220(1) are placed at the ID0 and ID1 positions, this corresponds to the connector 126(1) which has ID0, ID1, and ID2 equalling a binary value of "001", which means that an external microphone and an external speaker are attached by cable 201 to the connector 126(1).

Finally, if all three resistors 220(0), 220(1), and 220(2) are placed at the ID0, ID1 and ID2 positions, as shown in FIG. 2A, this corresponds to the connector 126(0), which indicates that a RJ11 cable is attached at 200, for public switched telephone network operations. The cable 200 is attached to the connector 126(0).

FIG. 3 is a more detailed schematic diagram of the reprogramming option connector 126(6) and the decoder 122. The connector includes the terminal pin array 302 which includes 33 terminals. Also shown is the line 304 which is the positive voltage VCC from the battery 128 that is applied to the 12 volt step-up regulator 306. The ground potential 308 from battery 128 is also applied to the regulator 306.

The multiplexer (MUX) 352 interfaces between the system bus 104 and the decoder 122. It passes ID0, ID1, and ID2 from the circuit 222 to the bus 104. It passes control signal 310 from the CPU 106 and the bus 104 to the regulator 306. It passes the programming voltage sense signal 314 from the regulator 306 back to the bus 104. And it passes the programming voltage steering signal from the CPU 106 and bus 104 to the switch MUX 350. The regulator 306 produces a well regulated programing voltage VPP that is switched on and off by the signal 310. The programming voltage VPP is applied to the switch MUX 350, and the steering signal from MUX 352 to MUX 350 directs the programming voltage VPP either to the application EPROM 110 on line 130 or to the BIOS EPROM 108 on line 132.

The control-in signal 310 is applied to the regulator 306, to switch on the programing voltage VPP on line 312. When VPP is on, the potential difference between ground and VPP is used to light the light emitting diode (LED) 316 to indicate to the user the interval during which the programming voltage is being applied to the EPROMs. A sensing voltage on line 314 is output from the regulator 306 to the bus 104, indicating when the programming voltage VPP is on. The control input signal on line 310 enables the regulator 306 to convert the positive voltage 304 into a well regulated, switched programming voltage VPP on line 312 which is applied through the decoder 122 to selectively either line 130 or the line 132 to reprogram the BIOS EPROM 108 or the application EPROM 110, respectively.

Figure 5:
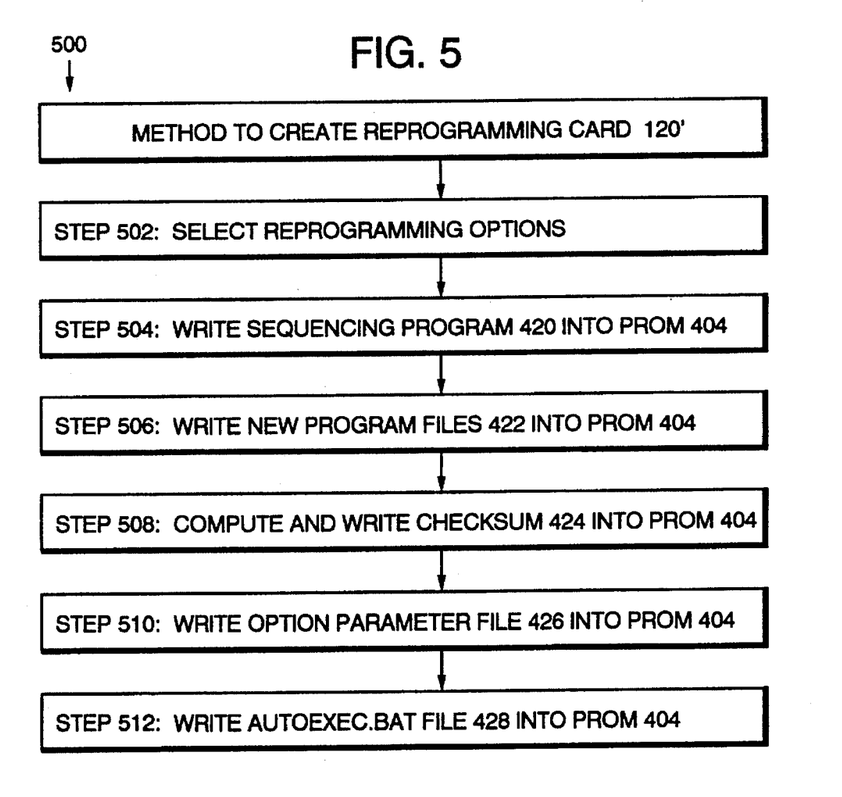
FIG. 5 is a flow diagram of the method to create the reprogramming card 120', in accordance with the invention.

FIG. 4 shows the reprogramming card 120' with the PROM 404 containing example files needed to reprogram the BIOS EPROM 108 and the application EPROM 110. The files in PROM 404 include AUTOEXEC.BAT 428, OPTIONS 426, CHECKSUM 424, NEW_BIOS 422B, NEW_APP 422A, and SEQUENCE PGM 420. FIG. 5 is a flow diagram of a method 500 to create the reprogramming card 120' of FIG. 4.

When the CPU 106 is reset, it is configured by a CONFIG.SYS file or other configuration information, to check the state of the ID0, ID1, and ID2 bits. If the value of those bits is "110", then the CPU 106 accesses the reprogramming card 120', as if it were a conventional disk drive. The CPU 106 accesses the reprogramming card 120' for the AUTOEXEC.BAT file 428. The AUTOEXEC.BAT file 428 contains the file name of the sequencing program 420. The CPU 106 then accesses the sequencing file 420 from the reprogramming card 120' and loads it into the RAM 102, and begins executing the sequencing program 420. FIG. 6A is a flow diagram of the method 600 to invoke the reprogramming option in the device 100.

The sequencing program 120' will call for the options file 426 to determine what types of new programs 422 are stored in the PROM 404, that are to be written into the EPROMs 108 and 110. The options file 426 will also specify the conditions under which the EPROMs are to be rewritten. Parameters can specify that the entire EPROM 108 or 110 is to be rewritten, or alternately, that only those new programs 422 in the PROM 404 that are different from existing programs in the EPROMs 108 and 110, are to be written into the EPROMs.

The CHECKSUM file 424 specifies the checksum values that are to be used as reference values to compare against corresponding checksums computed for new programs 422 written into the EPROMs 108 or 110.

Figure 6B:
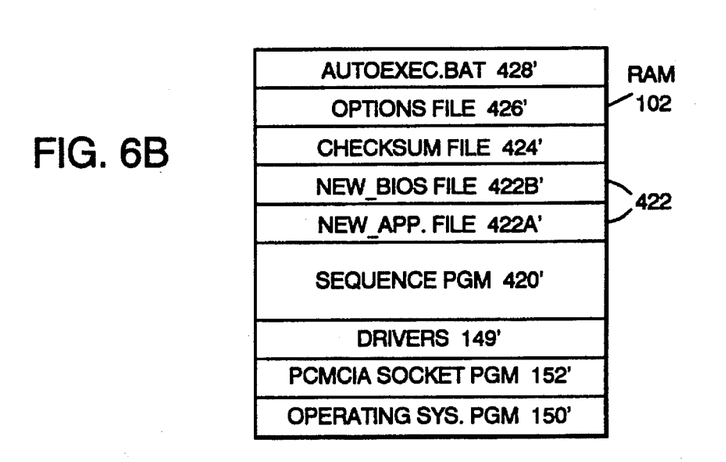
FIG. 6B is a functional block diagram of the RAM 102 after loading the sequencing program and the new programs from the reprogramming card 120'.

All of these features are optionally available to the sequencing program 420. FIG. 6B shows how the RAM 102 is loaded with AUTOEXEC.BAT 428', OPTIONS 426', CHECKSUM 424', NEW_BIOS 422B', NEW_APP 422A', and SEQUENCE PGM 420' from the corresponding files in the reprogramming card 120'.

Figure 7A:
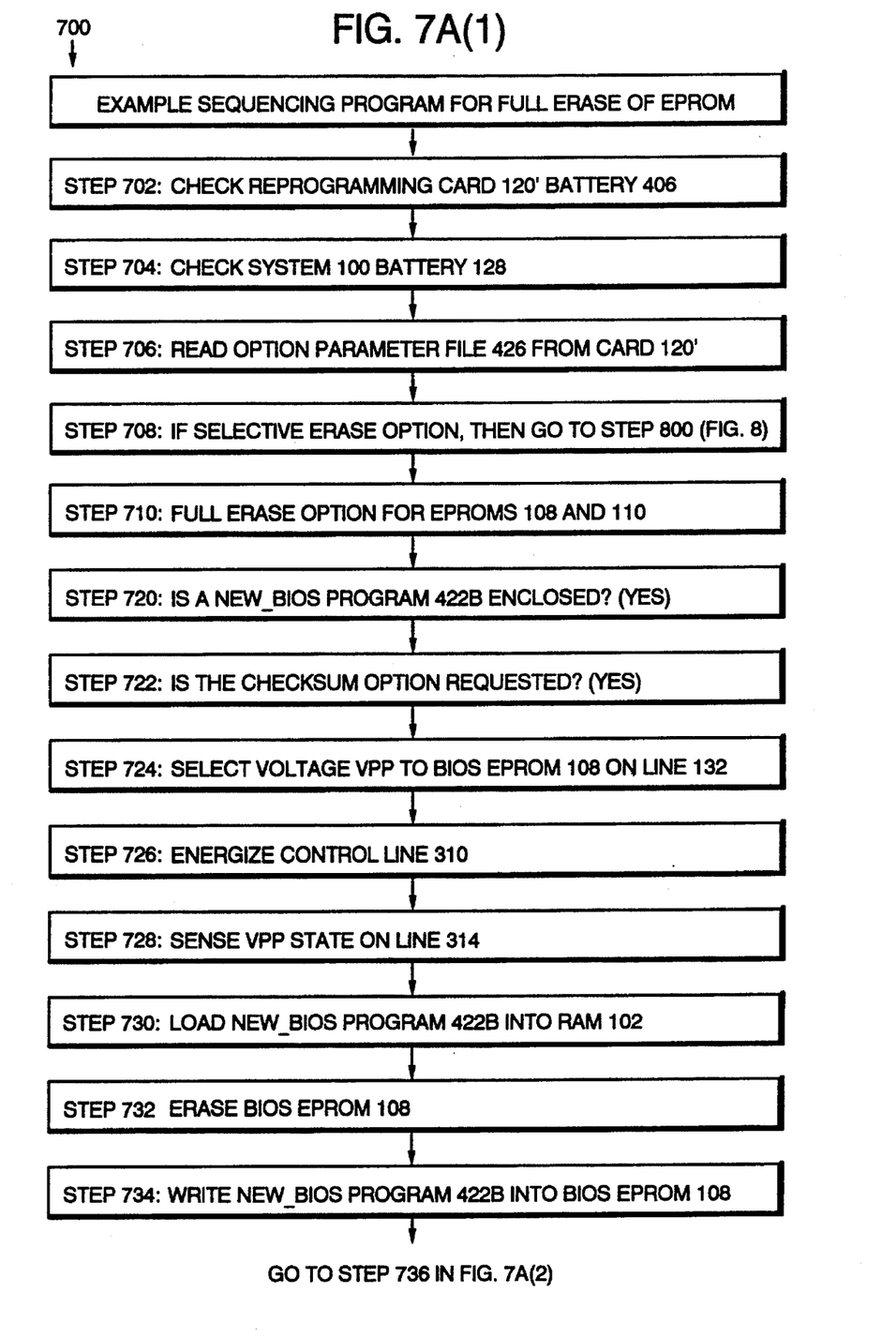
Figure 7B:
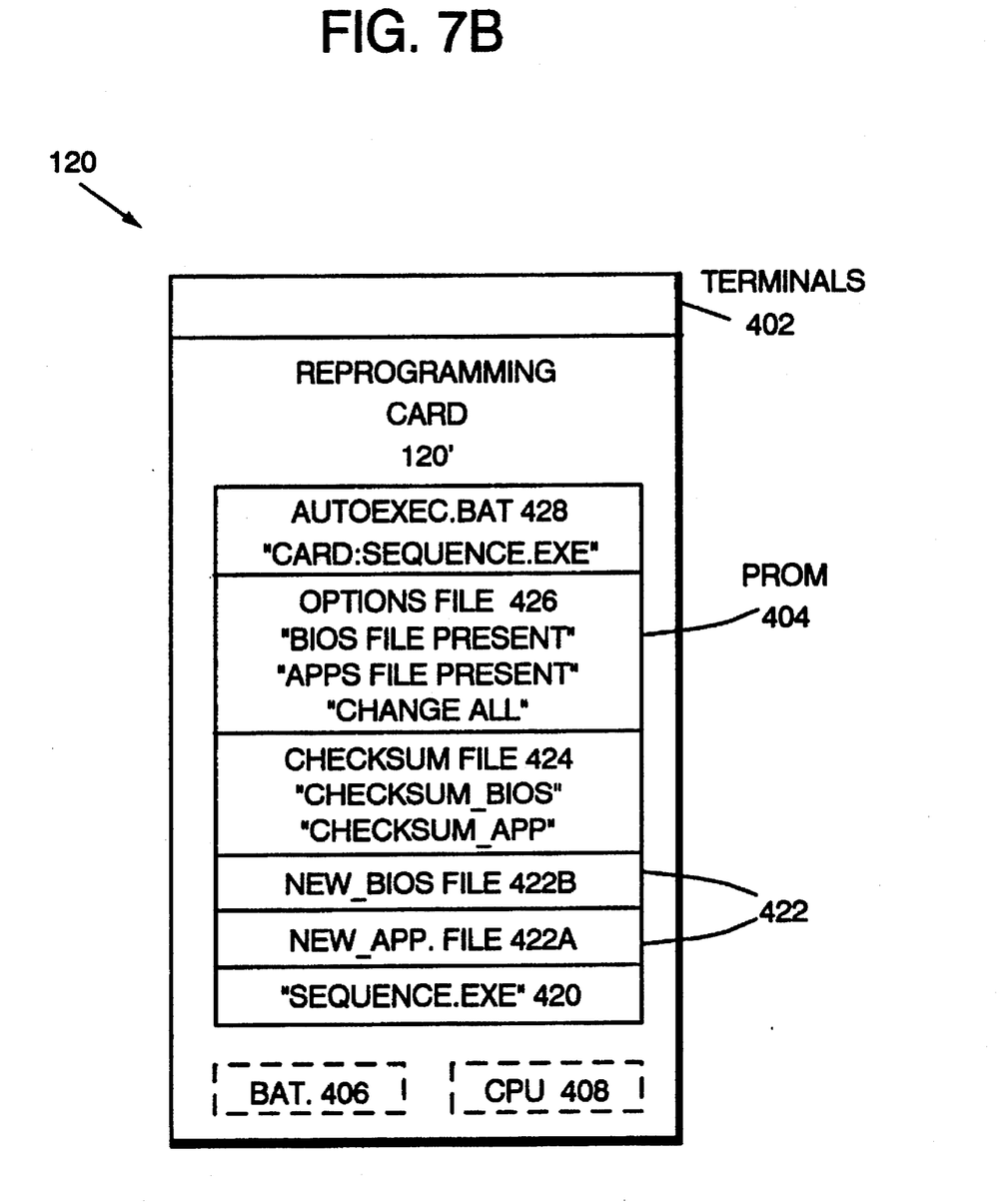
FIG. 7B is a functional block diagram of an example reprogramming card 120' operated upon by the sequencing program in the flow diagram of FIGS. 7A(1) and 7A(2).

An example of the sequencing program 420 is given in the flow diagrams of FIGS. 7A(1) and 7A(2) for the full erasure of the EPROMs 108 and 110. FIG. 7B is a functional block diagram of an example reprogramming card 120' operated upon by the sequencing program in the flow diagram of FIGS. 7A(1) and 7A(2). A second example of the sequencing program 420 is given in the flow diagrams of FIGS. 8A(1) and 8A(2) for the selective erasure of the EPROMs 108 and 110. FIG. 8B is an example of the content of a reprogramming card 120', as it is operated upon by the sequencing program in the flow diagram of FIGS. 8A(1) and 8A(2).

FIG. 5 is a flow diagram of method 500 to create the reprogramming card 120'. The steps are as follows:

Step 502: select reprogramming options.

Step 504: write sequencing program 420 into prom 404.

Step 506: write new program files 422 into prom 404.

Step 508: compute and write checksum 424 into prom 404.

Step 510: write option parameter file 426 into prom 404.

Step 512: write AUTOEXEC.BAT file 428 into prom 404.

The result of this method is the example reprogramming card 120' of FIG. 4.

FIG. 6A is a flow diagram of method 600 to invoke reprogramming option in system 100. The steps are as follows:

Step 602: connect reprogramming option connector 126(6).

Step 604: connect reprogramming card 120'.

Step 606: reset system 100.

Step 608: check state of option connector decoder 122.

Step 610: if decoder indicates reprogramming option, then read AUTOEXEC.BAT file 428 from reprogramming card 120'.

Step 612: load sequencing program 420 from reprogramming card 120' into ram 102.

Step 614: begin execution of sequencing program 420 in ram 102 by cpu 106.

The result of method 600 is to load the RAM 102, as is shown for example in FIG. 6B.

FIGS. 7A(1) and 7A(2) show a flow diagram of an example sequencing program 700 for full erase of EPROM. The steps are as follows:

Step 702: check reprogramming card 120' battery 406.

Step 704: check system 100 battery 128.

Step 706: read option parameter file 426 from card 120'.

Step 708: if selective erase option, then go to Step 800 (FIG. 8).

Step 710: full erase option for EPROMs 108 and 110.

Step 720: is a NEW_BIOS program 422B enclosed? (yes).

Step 722: is the checksum option requested? (yes).

Step 724: select voltage VPP to bios EPROM 108 on line 132.

Step 726: energize control line 310.

Step 728: sense VPP state on line 314.

Step 730: load NEW_BIOS program 422B into ram 102.

Step 732: erase bios EPROM 108.

Step 734: write NEW_BIOS program 422B into bios EPROM 108.

Step 736: compute checksum on NEW_BIOS in bios EPROM 108.

Step 738: compare with checksum 424 in reprogramming card

The flow diagram then goes to Step 750 in FIG. 7a(2).

Step 750: is a NEW_APP program 422A enclosed? (yes).

Step 752: is the checksum option requested? (yes).

Step 754: select voltage VPP to APP. EPROM 110 on line 130.

Step 756: energize control line 310.

Step 758: sense VPP state on line 314.

Step 760: load NEW_APP program 422A into ram 102.

Step 762: erase APP EPROM 110.

Step 764: write NEW_APP program 422A into APP EPROM 110.

Step 766: compute checksum on NEW_APP in APP EPROM 110.

Step 768: compare with checksum 424 in reprogramming card.

Then the program 700 returns to the main program. FIG. 7B is a functional block diagram of an example reprogramming card 120' operated upon by the sequencing program in the flow diagram of FIGS. 7A(1) and 7A(2).

Figure 8A:
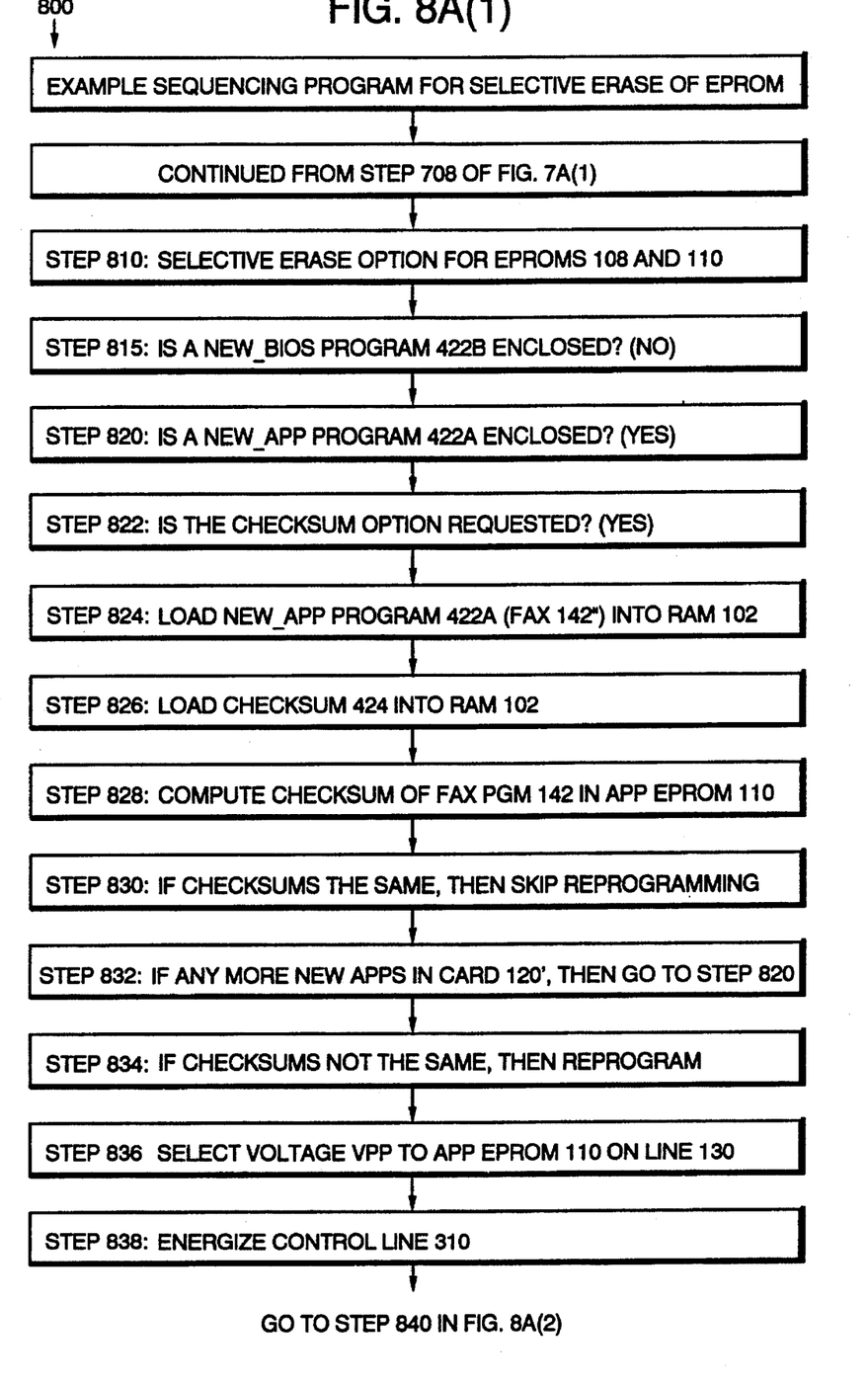
Figure 8B:
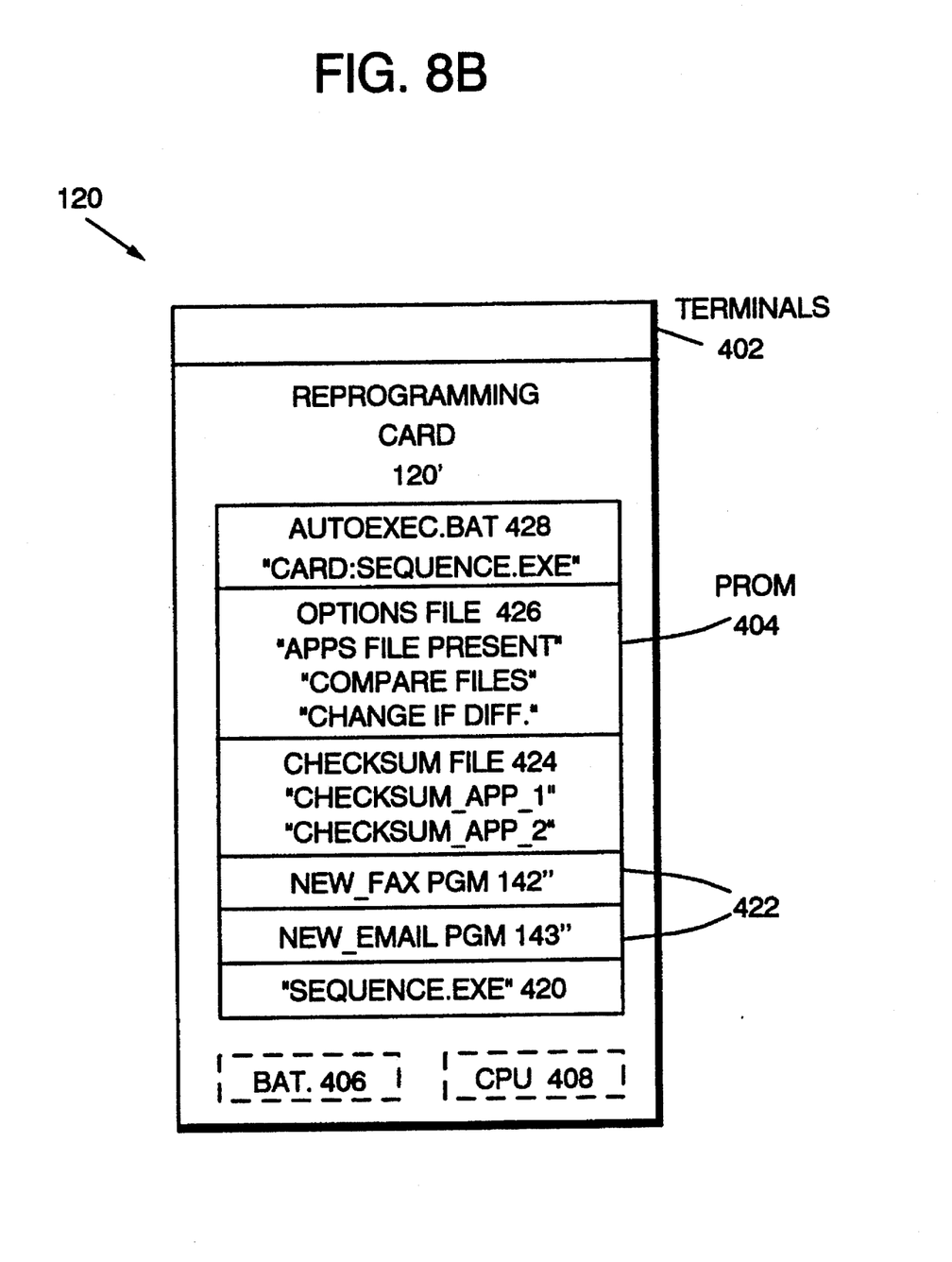
FIG. 8B is an example of the content of a reprogramming card 120', as it is operated upon by the sequencing program in the flow diagram of FIGS. 8A(1) and 8A(2).

FIGS. 8A(1) and 8A(2) show an example sequencing program 800 for selective erase of EPROM. The steps are as follows:

The flow diagram continues from Step 708 of FIG. 7a(1).

Step 810: selective erase option for EPROMs 108 and 110.

Step 815: is a NEW_BIOS program 422B enclosed? (no).

Step 820: is a NEW_APP program 422A enclosed? (yes).

Step 822: is the checksum option requested? (yes).

Step 824: load NEW_APP program 422A (fax 142") into ram 102.

Step 826: load checksum 424 into ram 102.

Step 828: compute checksum of fax PGM 142 in APP EPROM 110.

Step 830: if checksums the same, then skip reprogramming.

Step 832: if any more new APPs in card 120', then go to Step 820.

Step 834: if checksums not the same, then reprogram.

Step 836: select voltage VPP to APP EPROM 110 on line 130.

Step 838: energize control line 310.

Step 840: sense VPP state on line 314.

Step 842: selectively erase fax 142 in APP EPROM 110

The flow diagram goes to Step 844 in FIG. 8a(2).

Step 844: write each byte of NEW_APP fax 142" in APP EPROM 110.

Step 846: de-energize control line 310.

Step 848: compute checksum on NEW_APP 142" in APP EPROM 110.

Step 850: compare with checksum 424 in reprogramming card.

Step 852: any more new_apps 422 in card 120', then go to Step 820, else return.

The program then returns to the main program. FIG. 8B is an example of the content of a reprogramming card 120', as it is operated upon by the sequencing program in the flow diagram of FIGS. 8A(1) and 8A(2).

In this manner, the field programming tool, which includes the reprogramming card and the reprogramming option connector, provides an accurate, foolproof means of reconfiguring the programs and functions of the personal communications device.

Although a specific embodiment of the invention has been disclosed, it will be understood by those having skill in the art, that changes can be made to the specific embodiment without departing from the spirit and the scope of the invention.

What is claimed is:

1. A field programming subsystem for a portable communications device that includes an electrically programmable data storage, comprising:

a decoding means coupled to a programming voltage source and the programmable data storage, for selectively applying a programming voltage to the programmable data storage;

an option connector receptacle coupled to said decoding means;

a first option attach connector, for selective connection to said option connector receptacle;

a first connector identification means included with said first option attach connector, for identifying said first option attach connector to said decoding means, and in response thereto, said decoding means causing said programming voltage to be applied to said programmable data storage;

an auxiliary device receptacle coupled to the programmable data storage;

an auxiliary memory device, including auxiliary data, for selective connection to said auxiliary device receptacle;

said first connector identification means of said first option attach connector, identifying said auxiliary memory device to said decoding means, and in response thereto, said decoding means causing said auxiliary data to be stored in said programmable data storage.

2. The field programming subsystem for a portable communications device of claim 1, that further comprises:

a voltage regulating means in said first option attach connector, coupled to said programming voltage source, for providing a regulated voltage as said programming voltage.

3. The field programming subsystem for a portable communications device of claim 1, that further comprises:

a central processing unit coupled to said decoding means in said portable communications device, for executing programs stored in said portable communications device;

said central processing unit accessing a reprogramming sequencing program stored in said auxiliary storage device, in response to said detection means detecting first connector identification means of said first option attach connector;

said central processing unit executing said sequencing program to store said auxiliary data in said programmable data storage.

4. The field programming subsystem for a portable communications device of claim 3, that further comprises:

a voltage regulating means in said first option attach connector, coupled to said programming voltage source, for providing a regulated voltage as said programing voltage;

said central processing unit causing control signals to be sent to said voltage regulating means in response to executing said sequencing program, to control application of said programming voltage to said programmable data storage while storing said auxiliary data.

5. The field programming subsystem for a data processing device of claim 3, that further comprises:

a signal regulating means in said first option attach connector, coupled to said programming signal source, for providing a regulated signal as said programming signal;

said central processing unit causing control signals to be sent to said signal regulating means in response to executing said sequencing program, to control application of said programming signal to said programmable data storage while storing said auxiliary data.

6. A field programming subsystem for a portable communications device that includes an electrically programmable data storage, comprising:

a decoding means coupled to a programming voltage source and the programmable data storage, for selectively applying a programming voltage to the programmable data storage;

an option connector receptacle coupled to said decoding means;

a first option attach connector, for selective connection to said option connector receptacle;

a first connector identification means included with said first option attach connector, for identifying said first option attach connector to said decoding means, and in response thereto, said decoding means causing said programming voltage to be applied to said programmable data storage;

a second option attach connector connected to an external device, for selective connection to said option connector receptacle;

a second connector identification means included with said second option attach connector, for identifying said second option attach connector to said decoding means, and in response thereto, said decoding means coupling said external device to said portable communications device.

7. The field programming subsystem for a portable communications device of claim 6, that further comprises:

an auxiliary device receptacle coupled to the programmable data storage;

an auxiliary memory device, including auxiliary data, for selective connection to said auxiliary device receptacle;

said first connector identification means of said first option attach connector, identifying said auxiliary memory device to said decoding means, and in response thereto, said decoding means causing said auxiliary data to be stored in said programmable data storage.

8. The field programming subsystem for a portable communications device of claim 7, that further comprises:

a voltage regulating means in said first option attach connector, coupled to said programming voltage source, for providing a regulated voltage as said programming voltage.

9. The field programming subsystem for a portable communications device of claim 7, that further comprises:

a central processing unit coupled to said decoding means in said portable communications device, for executing programs stored in said portable communications device;

said central processing unit accessing a reprogramming sequencing program stored in said auxiliary storage device, in response to said detection means detecting first connector identification means of said first option attach connector;

said central processing unit executing said sequencing program to store said auxiliary data in said programmable data storage.

10. The field programming subsystem for a portable communications device of claim 9, that further comprises:

a voltage regulating means in said first option attach connector, coupled to said programming voltage source, for providing a regulated voltage as said programming voltage;

said central processing unit causing control signals to be sent to said voltage regulating means in response to executing said sequencing program, to control application of said programming voltage to said programmable data storage while storing said auxiliary data.

11. The field programming subsystem for a portable communications device of claim 10, that further comprises:

a switch means coupled to said central processing unit and to said voltage regulator means, for selectively applying said programming voltage to a first programmable data storage or to a second programmable data storage in said portable communications device, in response to options information stored in said auxiliary memory device.

12. A field programming subsystem for a data processing device that includes a programmable data storage, comprising:

a decoding means coupled to a programming signal source and the programmable data storage, for selectively applying a programming signal to the programmable data storage;

an option connector receptacle coupled to said decoding means;

a first option attach connector, for selective connection to said option connector receptacle;

a first connector identification means included with said first option attach connector, for identifying said first option attach connector to said decoding means, and in response thereto, said decoding means causing said programming signal to be applied to said programmable data storage;

an auxiliary device receptacle coupled to the programmable data storage;

an auxiliary memory device, including auxiliary data, for selective connection to said auxiliary device receptacle;

said first connector identification means of said first option attach connector, identifying said auxiliary memory device to said decoding means, and in response thereto, said decoding means causing said auxiliary data to be stored in said programmable data storage.

13. The field programming subsystem for a data processing device of claim 12, that further comprises:

a signal regulating means in said first option attach connector, coupled to said programming signal source, for providing a regulated signal as said programming signal.

14. The field programming subsystem for a data processing device of claim 12, that further comprises:

a central processing unit coupled to said decoding means in said data processing device, for executing programs stored in said data processing device;

said central processing unit accessing a reprogramming sequencing program stored in said auxiliary storage device, in response to said detection means detecting first connector identification means of said first option attach connector;

said central processing unit executing said sequencing program to store said auxiliary data in said programmable data storage.

* * * * *